United States Patent [19]
Ballard

[11] Patent Number: 5,282,502
[45] Date of Patent: Feb. 1, 1994

[54] BICYCLE PROTECTIVE COVER

[75] Inventor: Michael C. Ballard, Houston, Tex.

[73] Assignee: Proteq Partners, Ltd., Houston, Tex.

[21] Appl. No.: 970,124

[22] Filed: Nov. 2, 1992

[51] Int. Cl.$^5$ .............................................. B60R 9/10
[52] U.S. Cl. .................... 150/167; 206/335; 296/78.1; 296/136
[58] Field of Search ................ 150/167; 206/335; 296/136, 78.1

[56] References Cited

U.S. PATENT DOCUMENTS

| D. 25,879 | 8/1896 | Constantin | D12/156 |
|---|---|---|---|
| D. 26,487 | 1/1897 | Nelson | D12/156 |
| 1,853,742 | 4/1932 | Owen et al. | 150/167 X |
| 3,968,913 | 7/1976 | Weed et al. | 224/42.03 B |
| 4,261,401 | 4/1981 | Hickey | 206/335 |
| 4,356,831 | 11/1982 | Adams | 150/167 |
| 4,693,289 | 9/1987 | Taylor et al. | 150/52 R |
| 4,715,646 | 12/1987 | Goffi et al. | 296/136 |
| 4,792,040 | 12/1988 | Wagstaff III | 206/223 |
| 4,795,207 | 1/1989 | Clarke | 296/136 |
| 4,821,785 | 4/1989 | Rolan | 150/166 |
| 4,876,981 | 10/1989 | Barnhart | 116/173 |
| 4,923,104 | 5/1990 | Rice et al. | 224/155 |
| 4,944,340 | 7/1990 | Tortorich | 150/167 |
| 4,976,389 | 12/1990 | McLellan et al. | 224/328 |

FOREIGN PATENT DOCUMENTS

| 381917 | 8/1990 | European Pat. Off. | 296/136 |
|---|---|---|---|
| 3526208 | 1/1987 | Fed. Rep. of Germany | 296/78.1 |
| 2434076 | 4/1980 | France | 296/136 |
| 487299 | 11/1953 | Italy | 296/136 |
| 558022 | 2/1957 | Italy | 296/78.1 |
| 2088798 | 6/1982 | United Kingdom | 296/136 |

Primary Examiner—Sue A. Weaver
Attorney, Agent, or Firm—Pravel, Hewitt, Kimball & Krieger

[57] ABSTRACT

A protective cover is provided for a bicycle or the like. The cover is adapted for use with several types of bicycles, such as multispeed road, hybrid or mountain bikes, for protective purposes. The cover has side wall members extending over and substantially covering the side of the wheel and tire portions of the bicycle. The cover also a center panel which is mounted extending between the side wall members to fit over and cover the seat and handlebars. The center panel is shaped for use with various seat and handlebar arrangements. The cover may also be provided with a cover sleeve or fitting for aero bars, the arm rests or weight supports provided for use with bicycles in competitive cycling events.

11 Claims, 2 Drawing Sheets

BICYCLE PROTECTIVE COVER

BACKGROUND OF THE INVENTION

1. Field of Invention

The present invention relates to protective covers for bicycles or the like.

2. Description of Prior Art

There are a number of instances where it has been desirable to cover and protect a bicycle against weather or other conditions, usually rain. In some situations, it is desirable to be able to quickly and effectively cover the bicycle, such as in the event of a sudden weather change. In other circumstances, such as competitive cycling events, it is necessary to securely cover one's bicycle and leave it at a common storage site the evening before the competition.

No matter the intended use, bicycle covers have been subject to competing considerations or trade offs between the effectiveness of the cover provided, and the complexity of manufacture and therefore cost. A single drop sheet or tarpaulin-like cover would be simple to make and thus relatively inexpensive, but would be difficult to keep in place on the bicycle if the weather became even slightly windy. On the other hand, covers specifically intended for tightly fitting over bicycles were generally made from a number of specially shaped cover fabric pieces. As such they became relatively expensive to manufacture and assemble.

There have been a number of types of protective covers for bicycles or other vehicles proposed in the prior art. Certain types of bicycle covers were intended as protective covers for the bicycles during their transport on other vehicles, usually a car or van. In these situations, aerodynamic flow and snug fitting considerations required relatively complex cover structures. Certain other types of covers were intended for use to protect other types of vehicles, which governed their shape. Because of their particular shape, they were not suitable for use as bicycle covers.

SUMMARY OF INVENTION

Briefly, the present invention provides a new and improved protective cover for a bicycle to protect it against adverse weather conditions and the like. The protective cover according to the present invention has a center panel with front and rear portions adapted to fit over the wheels of the bicycle. The center panel tapers outwardly between the front and rear portions, which generally conform to the shape of the bicycle tires, to a center span which is adapted to fit over the handlebars of the bicycle.

The protective cover according to the present invention also includes side panel members mounted along the center panel. The side panel members extend along the length the center panel between its front and rear portions and are adapted to cover the sides of the frame, wheel, and tire portions of the bicycle. Gripping structure is mounted in the front and rear portions of the center panel and in adjacent portions of the side panel members. The gripping structure preferably takes the form of resilient or elastic strips which conform and snugly fit the center panel and side wall members of the protective cover to the wheels of the bicycle. The protective cover, according to the present invention, also includes a protective cover attachment for bicycles provided with aero bar arm supports or rests.

DESCRIPTION OF PREFERRED EMBODIMENT

Figure 2:
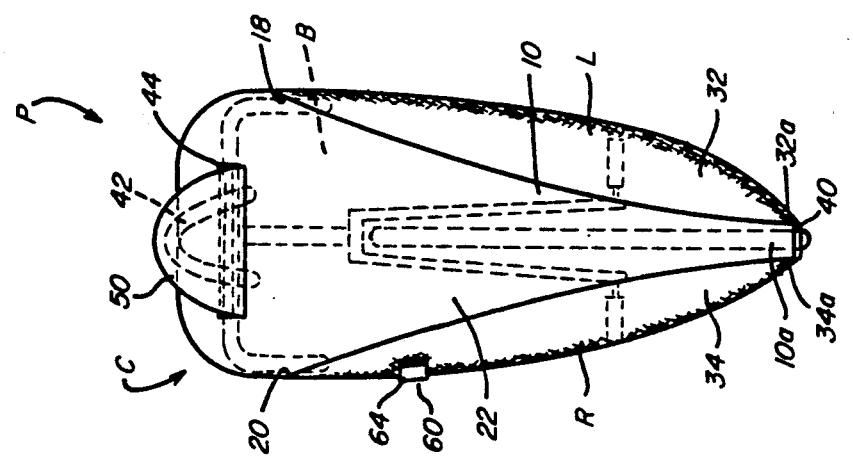
FIG. 2 is a front elevation view of the bicycle protective cover of FIG. 1.
Figure 1:
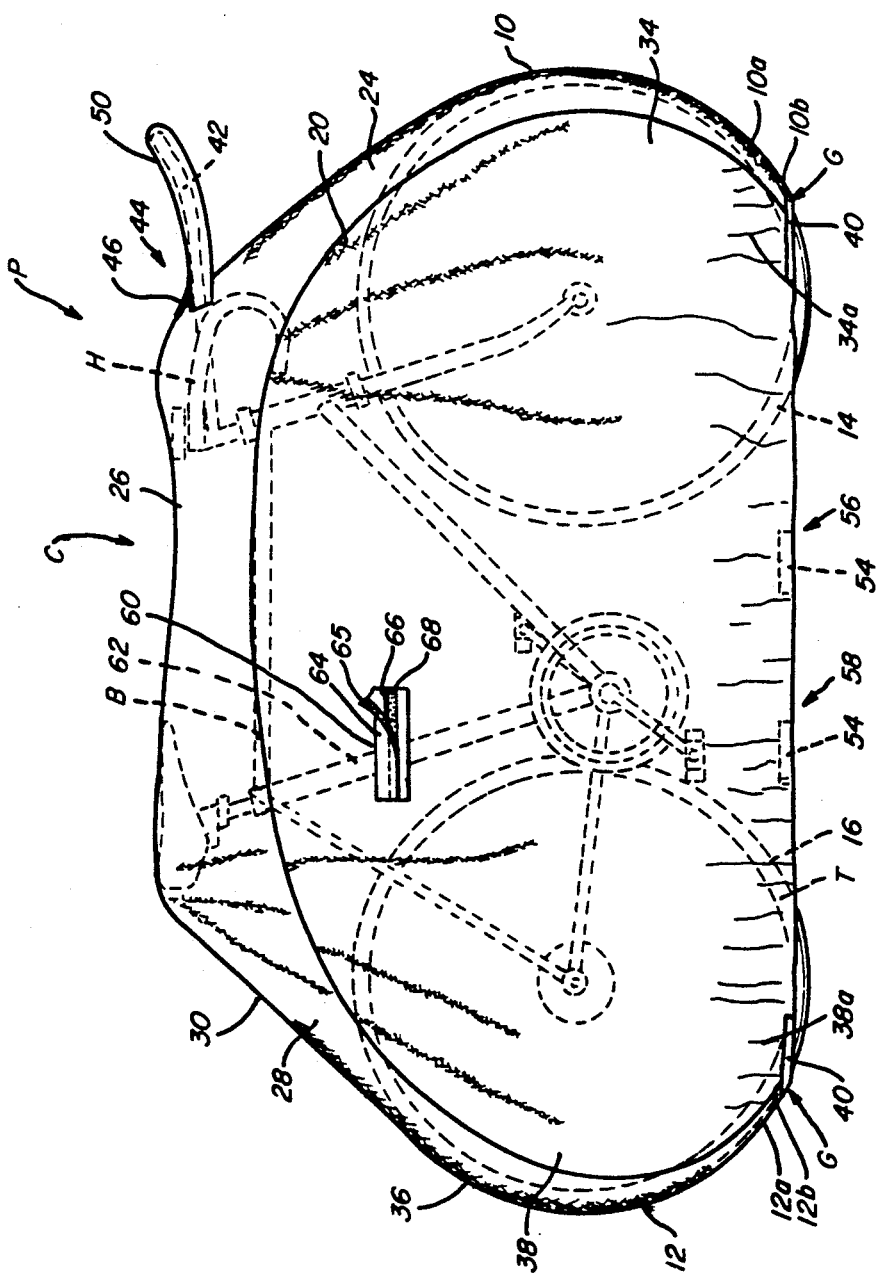
FIG. 1 is a side elevation view of a bicycle protective cover according to the present invention.
Figure 3:
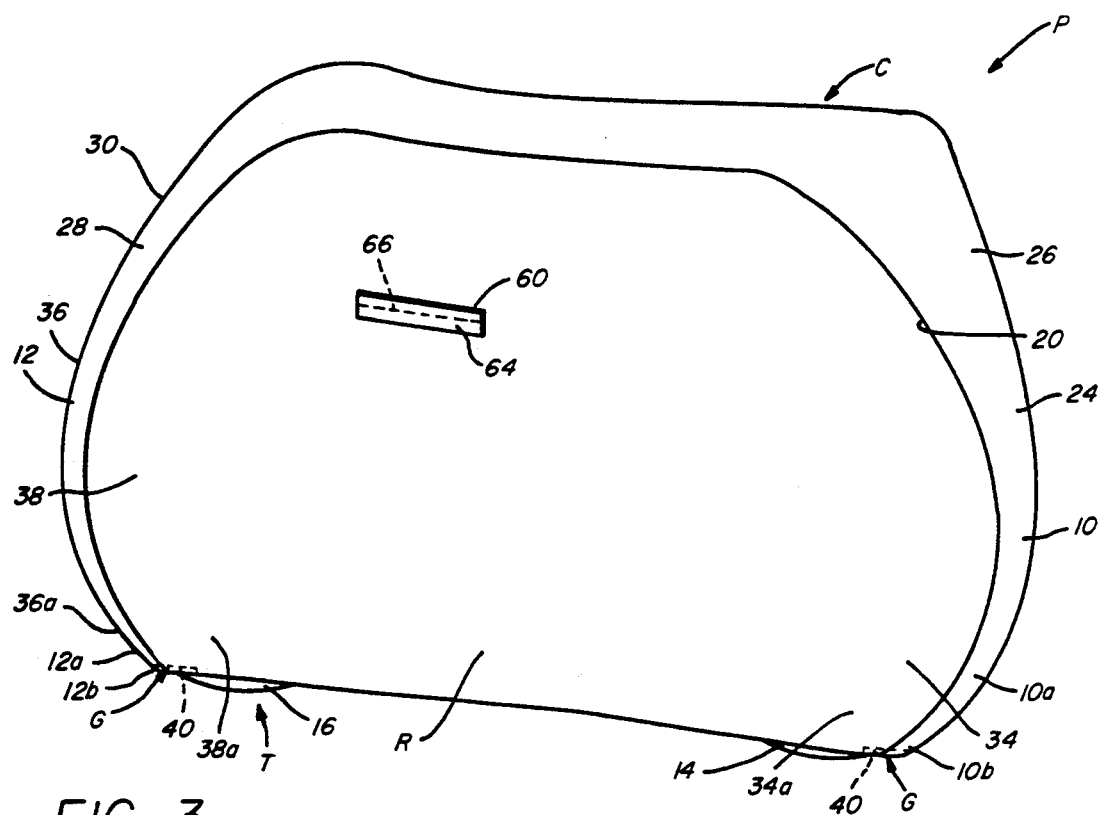
FIG. 3 is an isometric view of a bicycle protective cover according to the present invention.
Figure 4:
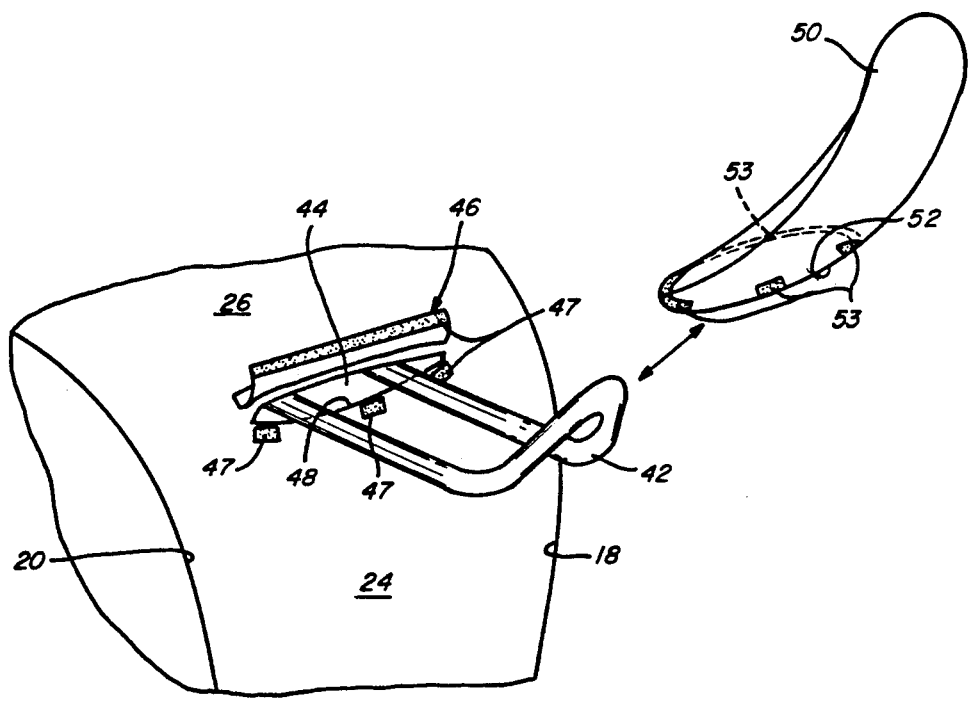
FIG. 4 is a partially exploded isometric view of a portion of the bicycle protective cover of FIG. 1.

In the drawings, the letter P designates generally a protective cover for a bicycle B or the like. The bicycle B which is covered and protected by the cover P may be any of several commercially available types. Examples include multi-speed bicycles of several types, such as road bicycles or bikes, mountain bikes and hybrid bikes. For example, the bicycle shown covered in FIG. 3 may be a mountain bike, while that of FIGS. 1 and 2 is the road or hybrid type. It should be understood that the cover P may be used as a protective cover for other types of bicycles and the like as well.

The protective cover P has a center panel C which has as a front portion 10 and rear portion 12 which are adapted to fit over and cover the front wheel 14 and the rear wheel 16, respectively, of the bicycle B. The protective cover P also includes a side panel member L for the left side and side panel member R for the right side of the bicycle B. The side panel members L and R are mounted along the center panel C at seams 18 and 20, respectively, along the extent of the center panel C from the front portion 10 to the rear portion 12. The protective cover P also includes gripping structure G which is mounted in the front portion 10 and the rear portion 12 of the center panel C and the in the adjacent side panel members L and R, as will be set forth.

The center panel C is generally trapezoidal in shape, much in the shape of a diamond or a child's kite, tapering outwardly along front sides 22 and 24 from the front portion 10 to a center span 26. The center panel C also tapers outwardly along rear sides 28 and 30 which extend from the rear portion 12 to the center span 26. The center span 26 is generally located closer to the front portion 10 than the rear portion 12 of the center panel C and is adapted to rest at or near the handle bars H of the bicycle B. The center span 26 is typically approximately two feet or so in width. In one embodiment, the center span 26 has a lateral extent of approximately twenty-five inches. The front portion 10 and rear portion 12 of the center panel C are substantially equal in width at their outer segments 10a and 12a, respectively, to the width of the tires T on the front wheel 14 and rear wheel 16 of the bicycle B. In this manner, the front portion 10 and rear portion 10 of the center panel C form a generally snug fit of the cover P enclosing the bicycle B.

The center panel C, as well as the side panel members L and R are preferably formed of a suitable denier of tear-resistant or ripstop synthetic resin material. The synthetic resin material of the center panel C and the side panel members L and R is also preferably of the water proof or water-resistant type. Examples of such a material include materials sold under the trademarks ANTRON ® and CAPROLAN ®. It should be understood that other fabrics of suitable strength and water resistance may be used, if desired.

The side panel members L and R are generally sewn or otherwise fixedly attached along seams 18 and 20 over the extent of the center panel C from the front portion 10 to the rear portion R. The side panel members L and R are generally semi-circular or arcuate along front surfaces 32 and 34, respectively, adjacent the outer segment 10a of the front portion 10 of the center panel C. With this shape, the side panel member L and R conform to the curvature of the front wheel 14 of the bicycle B. Similarly, the side panel member L and R are generally semi-circular or arcuate along rear surfaces 36 and 38 adjacent an outer segment 12a of the rear portion 12 of the center panel C to conform to the curvature of the rear wheel 16 of the bicycle B.

The gripping structure G takes the form of resilient, expandable strips 40 of elastic or other suitable material which are sewn or otherwise mounted at lower edge portions 10b and 12b of the center portion C adjacent the outer segments 10a and 12a. The resilient gripping strips 40 may be single strips at each lower edge portion 10b and 12b, or they may take the form of several such strips extending parallel to each other. The resilient gripping strips 40 are also mounted in and extend into the lower edge portions 32a and 34a of the front surfaces 32 and 34 of the side panel members L and R. Also, the resilient gripping strips 40 are mounted in and extend into the lower edge portions 36a and 38a of the rear surface portions 36 and 38 of the side panel members L and R, respectively. The resilient gripping strips 40 cause the side panel members L and R as well as the center panel C to snugly fit about and engage the front wheel 14 and the rear wheel 16 of the bicycle B, typically at their lowermost areas adjacent the ground or other surface. In this manner, the protective cover P may be snugly fitted over the bicycle B in its entirety to protect it against weather or other adverse conditions.

Certain types of bicycles are equipped with arm supports or rests known generally as aero bars, as indicated at 42. The protective cover P includes provision of protective cover for such aero bars against weather or adverse conditions as well. A transversely extending, selectively openable attachment slot 44 is formed across a portion of the center span 26 of the center panel C. Closures or fasteners 47, such as VELCRO ® strips or tabs, zippers or the like are formed along side portions 46 and 48 of the center span 26 adjacent the slot 44. The slot 44 may be opened for passage of the aero bars 42 when the protective cover P is fitted over the bicycle B.

A protective sock or pouch 50 is provided for fitting as a protective cover the over the aero bars 42. The protective sock 50 is provided at edge portions 52 with closures or fasteners 53 matching the fasteners 47 along the side portions 46 and 48 adjacent the attachment slot 44. The fasteners on edge portions 52 of protective sock 50 attach the protective sock 50 to the cover P and close and cover the aero bars 42 within the protective cover P along with the remainder of the bicycle B.

In certain situations, it is also desirable to include one or more closure strip attachment members 54 which are mounted within the side panel members L and R at lower central portions 56 and 58, respectively. The closure strip attachment members are formed preferably of a suitable fastener material, such as VELCRO ® strips and engage with each other, completing the snug fit of the protective cover P over the bicycle B. The protective cover may also be provided with suitably located security port or opening 60 so that a key or combination lock may be inserted through the protective cover P to lock the bicycle. The security port 60 is preferably located on either of the side panel members L or R, as desired, in the vicinity of the seat support shaft 62 of the bicycle. The security port 60 is formed by a flap 64 covering an elongate reinforced opening or slit 66. The flap 64 has a fastener strip 65 of VELCRO ® or the like along its lateral extent which mates with a similar strip 68 adjacent opening 66 to form a weather tight protective shield. Any suitable bicycle lock, such as U-shaped locks shown as krypton locks, or cables may be passed through the security port 60 for locking purposes. The matching fastener strips 65 and 68 seal about the lock for weather protection.

In the operation of the present invention, the protective cover P may be fitted over the bicycle B while the bicycle B is in its normal, upright position. Thus, no need exists for special manipulation or handling of the bicycle B in order to cover it with the protective cover P. The protective cover P is quickly and snugly fitted over the bicycle B by moving the resilient strips of the gripping structure G downwardly about the lower portions of the wheels 12 and 14 of the bicycle B, enclosing and protecting the bicycle B.

As has been set forth above, if the bicycle B is equipped with aero bars 42, the attachment slot 44 may be opened so that the bars 42 may pass therethrough. Thereafter, the protective sock 50 may be fitted over the aero bars 42 and attached to the center panel C. The closure strip attachment members 54 may be engaged with each other to complete the close fit of the protective cover P over the bicycle B. If desired, a lock may also be inserted through the lock ports or openings 60 to lock the protective cover P in place on the bicycle B.

Having described the invention above, various modifications of the techniques, procedures, material and equipment will be apparent to those in the art. It is intended that all such variations within the scope and spirit of the appended claims be embraced thereby.

I claim:

1. A protective cover for a bicycle provided with aero bars extending forward from its handle bars, comprising:

a center panel extending from the front wheel to the rear wheel of the bicycle and having front and rear portions adapted to fit over and around the wheels of the bicycle, wherein said front and rear portions of said center panel are substantially equal in width at an outer end segment to the width of a bicycle tire;

said center panel tapering outwardly over its extent between said front and rear portions to a center span adapted to fit over the handlebars of the bicycle;

side panel members mounted along said center panel along the extent thereof between said front and rear portions thereof;

gripping means mounted in said front and rear portions of said center panel and side panel members for fitting over and engaging the wheels of the bicycle;

said center panel having a slot formed therein;

attachment means mounted adjacent said slot for selectively closing said slot;

a protective sock fittable over the aero bars; and means for attaching said protective sock to said attachment means.

2. The protective cover of claim 1, wherein:

said center panel is trapezoidal in shape, having:

front sides extending from said front portion to said center span; and rear sides extending from said rear portion to said center span.

3. The protective cover of claim 1, wherein:

said center span of said center panel is substantially equal in width to the width of the handlebars of the bicycle.

4. The protective cover of claim 1, wherein:

said side panel members have arcuate front and rear surfaces conforming to the curvature of the bicycle tires.

5. The protective cover of claim 1, wherein said gripping means comprises:

resilient expandable strips mounted in lower edge portions of said front and rear portions of said center panel.

6. The protective cover of claim 5, wherein:

said resilient expandable strips extend into lower edge portions of said side panel members adjacent said front and rear portions of said center panel.

7. The protective cover of claim 1, wherein:

said center panel and said side panel members are formed of a tear-resistant synthetic resin material.

8. The protective cover of claim 1, further including:

closure strip attachment means mounted within said side panel members for engaging and closing said protective cover over the bicycle.

9. The protective cover of claim 1, wherein:

said center span of said center panel is spaced from said front portion of said center panel a distance corresponding to the spacing of the bicycle handlebars from the front wheel.

10. A protective cover for a bicycle provided with aero bars extending forward from its handle bars, comprising:

a center panel extending from the front wheel to the rear wheel of the bicycle and having front and rear portions adapted to fit over and around the wheels of the bicycle, said center panel including a slot for passage of the aero bars when the protective cover is fitted over the bicycle;

attachment means mounted adjacent said slot;

a protective sock fittable over the aero bars;

means for attaching said protective sock to said attachment means;

said center panel tapering outwardly between said front and rear portions to a center span adapted to fit over the handle bars of the bicycle; and side panel members mounted along said center panel along the extent thereof between said front and rear portions thereof.

11. The protective cover of claim 10, further including:

gripping means mounted in said front and rear portions of said center panel and side panel members for fitting over and engaging the wheels of the bicycle.

* * * * *